United States Patent Office 3,503,183
Patented Mar. 31, 1970

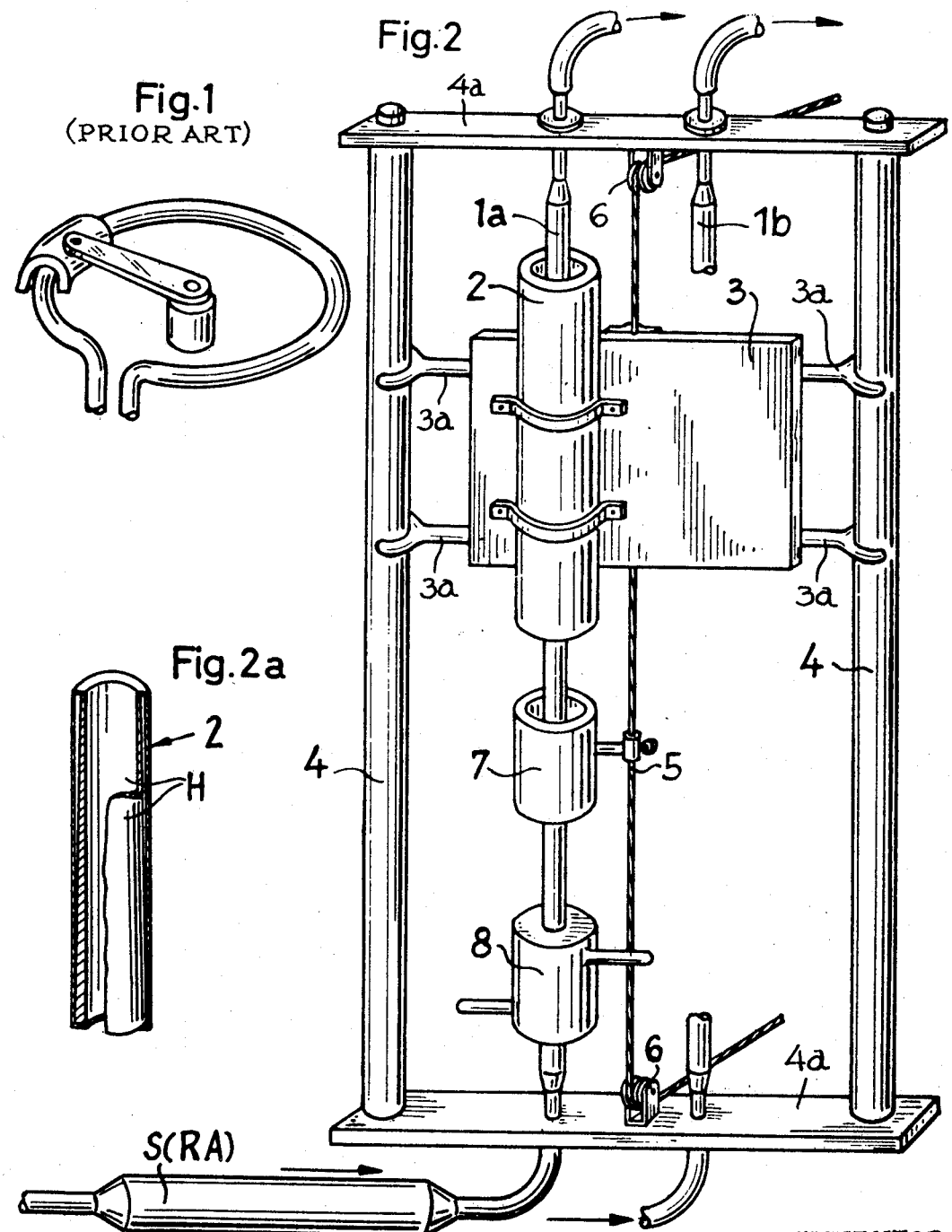

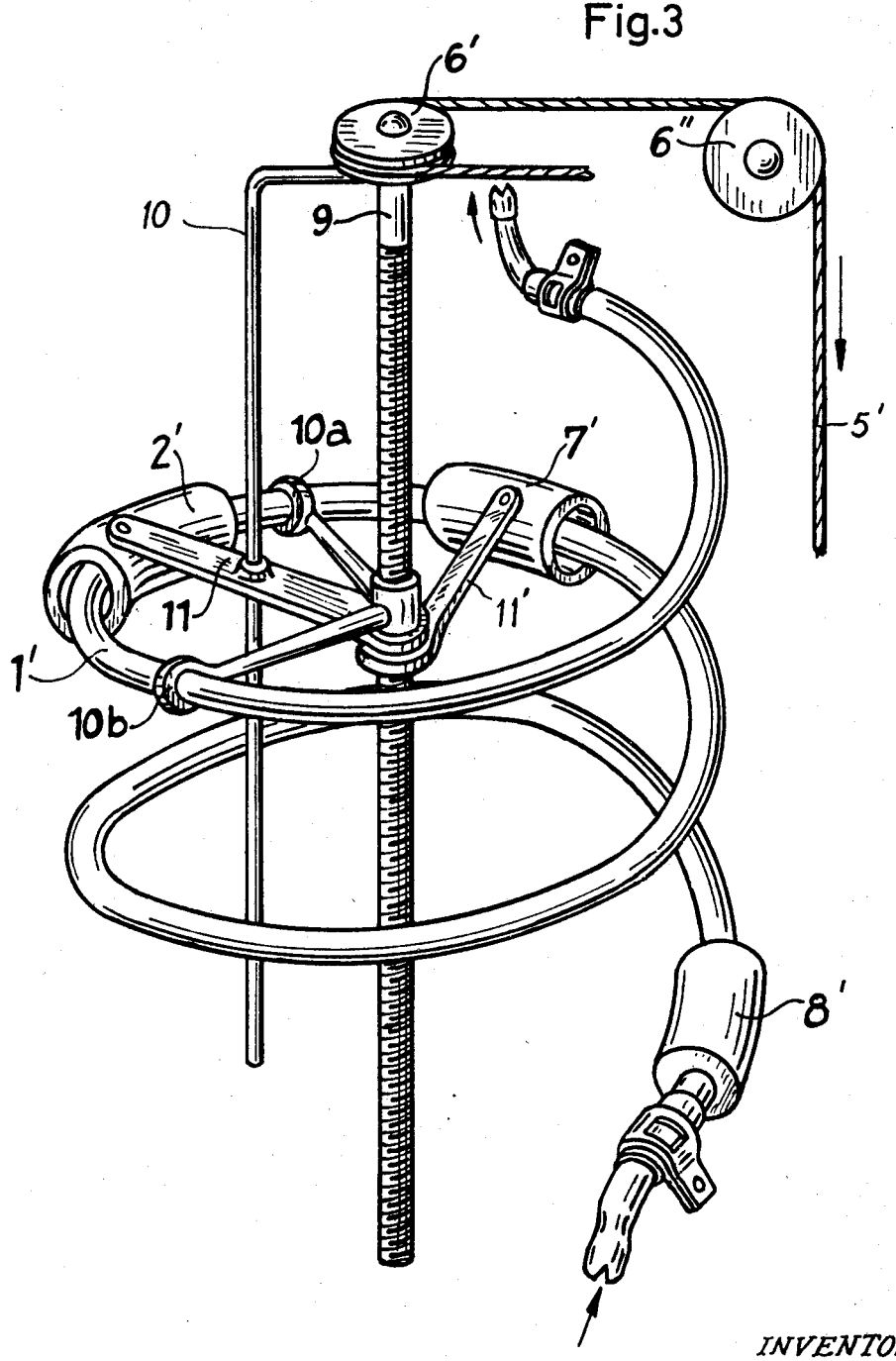

3,503,183
METHOD OF AND APPARATUS FOR THE SEPARATION AND DETERMINATION OF GAS AND VAPOR COMPONENTS
Rudolf Kaiser, Bad Durkheim, Germany, assignor to Siemens Aktiengesellschaft, a company of Germany
Filed June 6, 1967, Ser. No. 643,943
Claims priority, application Germany, June 10, 1966, B 87,482
Int. Cl. B01d 15/08
U.S. Cl. 55—67                           5 Claims

ABSTRACT OF THE DISCLOSURE

In gas chromatographic apparatus the separation column is surrounded by a plurality of longitudinally spaced movable members generating a plurality of reciprocatingly traveling heating or cooling temperature fields extending transversally across the separation column.

BACKGROUND OF THE INVENTION

This invention generally relates to methods of physical analysis of gases and vapors and in particular concerns an improved method of and apparatus for the gas chromatographic separation of such materials.

Several methods are presently known for the separation of gases or vaporous materials by gas chromatography. According to one known method, a circular chromatographic separation column is used which is traversed by a cyclically traveling temperature field causing desorption of the materials adsorbed by the packing material contained in the column. The desorbed components are then eluted by means of carrier gases constantly passing through the column and are sensed by means of an electronic detector.

It is known that the use of a traveling temperature field helps to improve the simultaneous elution and separation of the materials. Its further advantage resides in the fact that, opposed to other methods of elution in gas chromatography, the materials to be analyzed may be continuously introduced with the carrier gas into the separating column. Thus, the often malfunctioning intermittent introduction of the materials to be analyzed may be altogether eliminated.

A known apparatus for generating a traveling temperature field is shown in FIG. 1. There is illustrated a circular separation column along which travels, in a continuous and unidirectional circular motion, a tunnel-type arcuate heater which generates the traveling temperature field. The heater jacket which surrounds the column has to be interrupted along its entire length to enable it to pass over the supply and the output conduits of the column during its unidirectional travel. It is apparent that the longitudinally and arcuately extending slot in the heater jacket should have a width somewhat greater than the diameter of the afore-noted conduits. It is further apparent that adjacent the slot, the adsorbing packing material with which the separation column is entirely filled, cannot be homogeneously heated. Stated in different terms, there is no homogeneous temperature field normal to the axis of the column. As a result, the simultaneous elution and separation is substantially deteriorated and the separating effiiciency of the column is decreased. It is also a disadvantage that a circular column of great length is relatively difficult to manufacture and further, the vibration-free mounting or support of the column is problematic if a freedom is desired in the selection of dimensions and materials of which the column may be made. In addition, the structural arrangement of the afore-described apparatus renders the application of stationary temperature fields (such as a cooling field) at the entrance of the column considerably difficult.

According to another known method of elution by means of a traveling temperature field, a single cylindrical tunnel heater is moved to and fro along the separation column to generate a reciprocatingly traveling temperature field. A common disadvantage of an apparatus of this and the previously described type resides in the appearance of a premature and a delayed elution caused respectively by the leading and the trailing end of the single heater.

SUMMARY OF THE INVENTION

The broad principal object of this invention is to obviate the disadvantages of the known methods and apparatus by taking full advantage of the possibilities offered by traveling temperature fields to substantially increase the distinctness of separation during the breakup of the mixtures.

Briefly stated, the objectives set forth above are achieved by applying a plurality of temperature fields (heating or cooling fields) to the separation column; at least two of said fields are reciprocatingly traveling along the column. According to a further inventive feature there is provided a tunnel heater adapted to generate a transversal temperature field of increasing or decreasing temperature values along the length of the tunnel.

The invention will be better understood and further objects and advantages will become apparent from the ensuing specification taken in conjunction with the drawings.

BRIEF DESCRIPTION OF THE DRAWINGS

FIG. 1 is a schematic isometric view of a known apparatus referred to in the background of the invention;

FIG. 2 is a schematic isometric view of an embodiment of the invention;

FIG. 2a is an isometric sectional and partially broken away view of a novel tunnel heater, and FIG. 3 is a schematic isometric view of another embodiment of the invention.

DESCRIPTION OF THE NOVEL METHOD

Instead of a single reciprocating temperature field known to be presently used in chromatographic separation columns, according to the invention at least two temperature fields are reciprocated along the filled region of the column. The different temperature fields, which may be cooling or heating fields, may reciprocate with different speeds and/or have a different maximum temperature. It is particularly advantageous to have a cooling field follow the temperature field causing the elution. Such a cooling field causes the adsorption of all materials continuously carried by the carrier gas and thus prevents the mixing of these materials with those eluted by the temperature field. The occurrence of such mixing would substantially deteriorate the separation process. The inventive method results in a further improvement in the separating process of the breakup of mixtures in that a more distinct separation may be achieved of a group of materials having a low boiling point (or which transfer already at low temperatures) from materials having a high boiling point (or which transfer only at higher temperatures).

It is a further feature of the inventive method to periodically surround the entrance of the column by a cooling field in coordination with the reciprocating motion of the heating fields. This effectively prevents the highly volatile materials from transferring or breaking through the packing material without or before being exposed to one of the heating fields. Further, by maintaining predetermined delays of the reciprocating cooling or heating fields (that is, the reciprocating cooling and heating fields move with varied speeds), a substantial increase in the measuring sensitivity may be achieved even when volatile materials are present in the gases only in the smallest traces. The distinctness of separation and the measuring sensitivity which, together, determine the reliability of the quantitative analysis of the materials may be further augmented by associating the traveling heating field with a preceding and a following cooling field moving in unison therewith. Such an arrangement prevents the escape or break-through of the eluted materials from the region of the heating field with the help of the carrier gas flow.

The inventive method is not limited to specific detectors. The analytical result may be obtained with a high degree of sensitivity, however, if, instead of the usual detectors that are normally sensitive to quantitative flows, a special flame ionizing detector is used that is insensitive to quantitative flows.

DESCRIPTION OF THE APPARATUS

The apparatus for practicing the inventive method may be of different structure. If saving space is not an important consideration and the apparatus is intended to be stationary, the separation column which is to be exposed to reciprocating temperature fields is mounted linearly in a twist-resistant rigid stand or frame.

Turning now to FIG. 2, there is shown a rigid frame formed by two vertical, parallel posts 4 secured together by horizontal transverse spacers 4a. In the frame there are suspended two vertically and parallel extending separation columns 1a and 1b (only one shown in its entirety). Each separation column is surrounded by a laterally closed tunnel heater 2 each secured to a single carriage 3. To carriage 3 there are firmly affixed laterally extending guide members 3a which, for an accurate guiding of the carriage, slidingly engage the parallel posts 4. The carriage 3 is reciprocated by means of a cable 5 trained about pulleys 6 and actuated by motor means not shown. The driving means is conventional and is preferably designed in such a manner that, during reciprocation of the heaters 2, the speeds of upward and downward motion differ from one another. The return motion of the heater 2 is expediently faster than its forward motion since the duration of the return motion may not be utilized for the analysis. It will be apparent to those skilled in the art that for the aforenoted purpose a reversible multiple speed motor or reversible transmission may be used.

Instead of using a single carriage 3 which, as set forth hereinbefore, may carry a plurality of heaters 2 corresponding to the number of the separation columns, it will be apparent to those skilled in the art that the frame may be constructed so as to accommodate a plurality of carriages each associated with a single heater 2 and with its own actuating mechanism to effectuate an independent reciprocating motion of each heater 2 along each column. The use of a plurality of independently moving carriages 3 is also adavntageous for the independent reciprocation of additional movable cooling or heating fields. The heating field may be generated either by radiation or by induction.

In FIG. 2 there is further shown a second movable tubular member 7 adjustably secured to cable 5 to generate another reciprocating heating or cooling field traveling in unison with the field generated by heater 2. In addition, at the lower end of the column 1a there is provided a stationary refrigerator 8 generating a cooling field and preferably comprising a double jacket used as a heat exchanger in a cooling circuit. If the required temperatures are not too low, the cooler 8 may be replaced by a nozzle arrangement or a tangentially acting ventilator operated by pressurized air. It is also feasible to use cooled copper blocks to continuously or periodically firmly surround columns 1a and 1b for the purpose of supplying an additional cooling field.

Additionally activated columns S or reactors RA may be attached before or after the separation columns 1a or 1b.

It is not essential that in practicing the inventive method the separating columns be linear. For portable apparatus of smaller size it is expedient to use one or more helical separation columns mounted in a rigid frame. A portion of such an apparatus is schematically shown in FIG. 3. A helical separation column 1' secured to a frame (not shown) is surrounded by a movable tunnel heater 2' and a further movable member 7' to generate reciprocating cooling or heating fields. Except for their arcuate configuration these members are constructed similarly to members 2 and 7 shown in FIG. 2. For imparting a helical reciprocating motion to the heater 2' and to the cooling or heating member 7', there is provided a stationary threaded bar 9 extending coincidently with the axis of the separation column 1'. The pitch of the thread on bar 9 is identical to that of column 1'. To the upper end of bar 9 there is secured a freely rotatable pulley 6' to which there is rigidly affixed a driving rod 10 having a relatively short initial portion extending radially from the pulley 6' and then bent downwardly and extending parallel with bar 9 within the space defined by the helical column 1'. The driving rod 10 passes through an opening in a support member 11, one end of which is secured to the heater 2' while its other end is threadingly received on bar 9. A cable 5' is trained about pulleys 6' and 6'' and is connected to a motor means (not shown) which may be identical to that used in the embodiment shown in FIG. 2. As the pulley 6' is rotated by the cable 5', the driving rod 10, carried by pulley 6', imparts a rotary motion to the support member 11 which travels up and down on threaded bar 9 carrying with it heater 2' in a helical path. Heating or cooling member 7' is associated with a support member 11' which is secured to the support member 11 to ensure a motion in unison therewith. Rotary arms 10a and 10b may be used to stabilize the actuating means and to ensure a sufficiently accurate guiding of the arcuate members 2' and 7'. Element 8' has an identical function to that of element 8 shown in FIG. 2.

Preferably, the traveling temperature field generated by heaters 2 or 2' has a predetermined temperature profile causing, from the front to the rear of the reciprocating temperature field, a possibly continuous and preferably linear increase of temperature along the length of the heater. A heater structure adapted to generate a temperature field having the aforenoted characteristics is depicted in FIG. 2a. There is shown a tunnel heater generally indicated at 2 comprising a resistance heater element H. A particular feature of the resistance element H is its varying wall thickness along its length. Preferably, the heating element H is a conically machined tube made of a material adapted to be used as a resistance heater. In operation, this element has a higher temperature at its thin end than at its thick end. Thus, by virtue of element H, it may be possible to generate a linearly increasing temperature field. The thicker end of the element H points toward the forward or working direction so that each consecutive section of the separation column is exposed to an increased temperature within the temperature field.

What is claimed is:

1. In a method of gas chromatographic separation and determination of gas and vapor components by a traveling temperature field extending transversally of a separation column filled with a packing material, the improvement comprising simultaneously reciprocating a plurality of temperature fields at different speeds relative to each other along the filled space of said column.

2. A method as defined in claim 1, wherein said temperature fields comprise heating and cooling fields, at least one of said fields pausing temporarily during the course of its reciprocating motion.

3. A method as defined in claim 1, wherein said temperature fields include a heating field and two cooling fields, one disposed at each end of said heating field, all of said fields being reciprocated along said separation column.

4. In an apparatus for the gas chromatographic separation and determination of gas and vapor components by a traveling temperature field extending transversally of a separation column filled with a packing material, the improvement comprising, a plurality of members each surrounding said column with at least one of said members including a tubular resistance heater element and each member generating a temperature field extending transversally of said column, at least two of said members being constructed and arranged to reciprocate along said column to provide at least two traveling temperature fields, at least one of which is constructed and arranged to have an increasing temperature along its length.

5. An apparatus as defined in claim 4, wherein said heater element has a decreasing wall thickness along its length.

References Cited
UNITED STATES PATENTS

| | | | |
|---|---|---|---|
| 3,043,127 | 7/1962 | De Ford et al. | 55—386 X |
| 3,043,128 | 7/1962 | Ayers | 73—23.1 |
| 3,201,922 | 8/1965 | Villalobos | 55—67 |

JAMES L. DECESARE, Primary Examiner